United States Patent
Mentink

(10) Patent No.: US 11,820,067 B2
(45) Date of Patent: Nov. 21, 2023

(54) PREFORMED THERMOPLASTIC TUBE INCLUDING AT LEAST ONE BEND

(71) Applicant: KA Group AG, Zurich (CH)

(72) Inventor: Laurentius Andreas Gerardus Mentink, Haaksbergen (NL)

(73) Assignee: KA GROUP AG, Zurich (CH)

( * ) Notice: Subject to any disclaimer, the term of this patent is extended or adjusted under 35 U.S.C. 154(b) by 0 days.

(21) Appl. No.: 17/284,565

(22) PCT Filed: Feb. 4, 2020

(86) PCT No.: PCT/EP2020/052685
§ 371 (c)(1),
(2) Date: Apr. 12, 2021

(87) PCT Pub. No.: WO2021/155908
PCT Pub. Date: Aug. 12, 2021

(65) Prior Publication Data
US 2022/0410464 A1 Dec. 29, 2022

(51) Int. Cl.
*B29C 53/08* (2006.01)

(52) U.S. Cl.
CPC .................................. *B29C 53/083* (2013.01)

(58) Field of Classification Search
CPC ..................................................... B29C 53/083
See application file for complete search history.

(56) References Cited

U.S. PATENT DOCUMENTS

| 3,438,238 | A | * | 4/1969 | Arthur | B21C 37/28 |
| | | | | | 72/369 |
| 3,859,408 | A | * | 1/1975 | Voss | B29C 53/083 |
| | | | | | 264/573 |
| 3,884,612 | A | * | 5/1975 | Parmann | B29C 53/083 |
| | | | | | 425/389 |
| 3,965,715 | A | * | 6/1976 | Parmann | B29B 13/024 |
| | | | | | 72/369 |
| 4,097,573 | A | * | 6/1978 | Parmann | B29B 13/024 |
| | | | | | 264/339 |

(Continued)

FOREIGN PATENT DOCUMENTS

| DE | 3818912 A1 | 12/1989 |
| EP | 0920881 A2 | 6/1999 |
| FR | 2755382 A1 | 5/1998 |

OTHER PUBLICATIONS

International Search Report and Written Opinion for International Application No. PCT/EP2020/052685; International Filing Date Feb. 4, 2020; dated Oct. 8, 2020 (pp. 1-32).

*Primary Examiner* — Andrew D Graham
(74) *Attorney, Agent, or Firm* — CANTOR COLBURN LLP

(57) ABSTRACT

A method for making a preformed thermoplastic tube having a tube wall and including at least one bend formed by thermoforming, characterized in that on an inner curve of the bend the tube wall is provided with a pattern of corrugations with minimal dimensions in terms of number of and heights of corrugations such that a wall length reduction resulting from the corrugations along the inner curve is kept at a minimal value necessary to absorb overlength on the inner curve resulting from forming the bend, and in that on an outer curve of the bend the tube wall is smooth and free of corrugations.

10 Claims, 4 Drawing Sheets

(56) References Cited

U.S. PATENT DOCUMENTS

| | | | | |
|---|---|---|---|---|
| 4,464,923 A * | 8/1984 | Boggs | ............... | B21D 9/14 |
| | | | | 72/481.2 |
| 5,222,552 A * | 6/1993 | Schuchert | ............ | B21D 11/06 |
| | | | | 165/172 |
| 6,019,753 A * | 2/2000 | Pagan | ............ | A61M 25/0043 |
| | | | | 604/525 |
| 6,056,018 A | 5/2000 | Renaud | | |
| 6,123,113 A * | 9/2000 | Pontbriand | ............ | F16L 11/11 |
| | | | | 138/119 |
| 6,131,618 A * | 10/2000 | Brudny | ............ | B29C 53/84 |
| | | | | 264/322 |
| 6,447,709 B1 * | 9/2002 | Ijima | ............ | B21D 11/08 |
| | | | | 264/506 |
| 7,143,618 B2 * | 12/2006 | Ni | ............ | B21D 9/073 |
| | | | | 72/369 |
| 7,293,444 B2 * | 11/2007 | Hacker | ............ | B21D 7/024 |
| | | | | 72/157 |
| 7,721,582 B2 * | 5/2010 | Speck | ............ | B21D 7/12 |
| | | | | 72/305 |
| 8,096,326 B2 | 1/2012 | Palmeri | | |
| 2004/0151859 A1 * | 8/2004 | Nishino | ............ | F16L 9/127 |
| | | | | 428/36.91 |
| 2005/0208169 A1 * | 9/2005 | Johnson | ............ | B29C 53/083 |
| | | | | 425/392 |
| 2016/0153588 A1 * | 6/2016 | Valola | ............ | B29C 53/08 |
| | | | | 264/285 |
| 2016/0207247 A1 * | 7/2016 | Jaubert | ............ | B29C 53/083 |

* cited by examiner

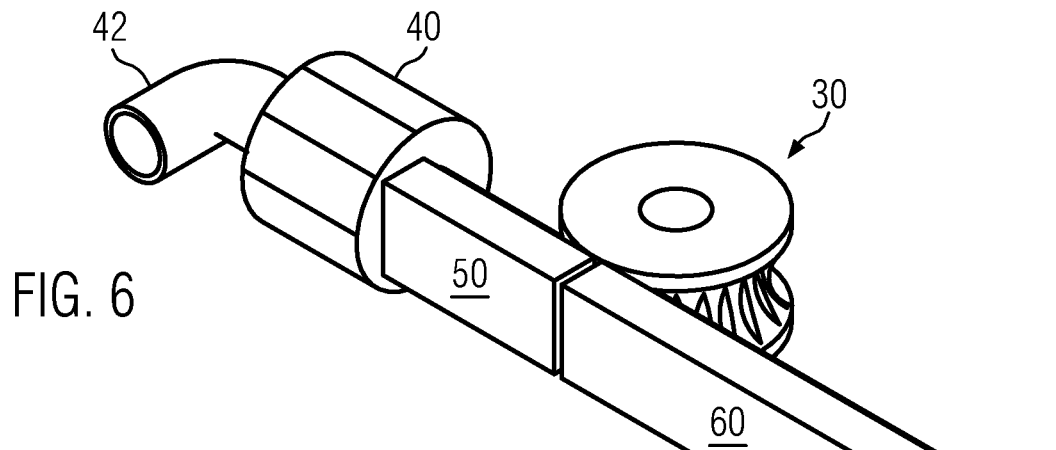
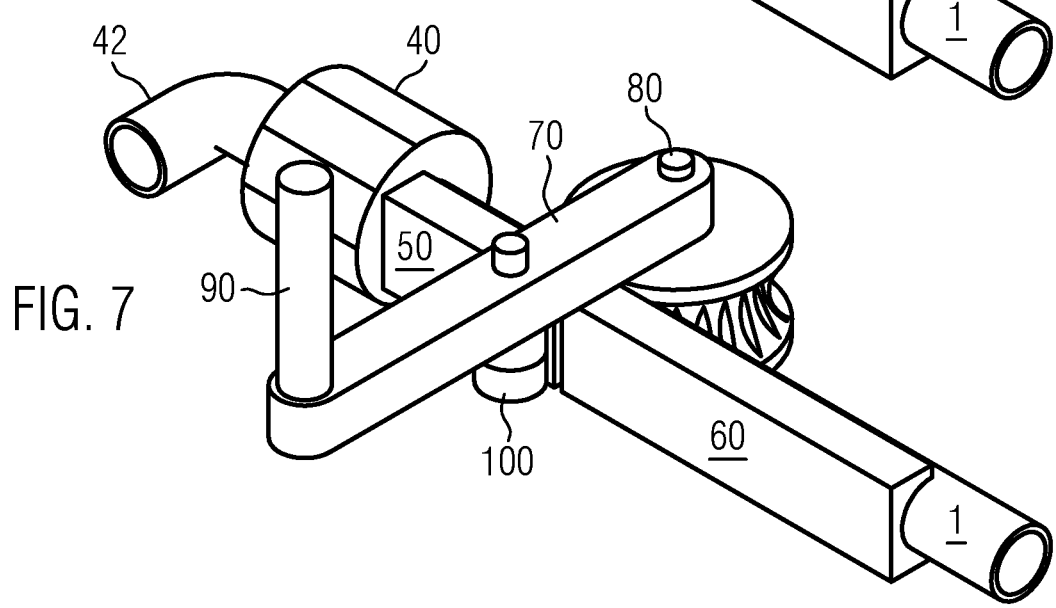
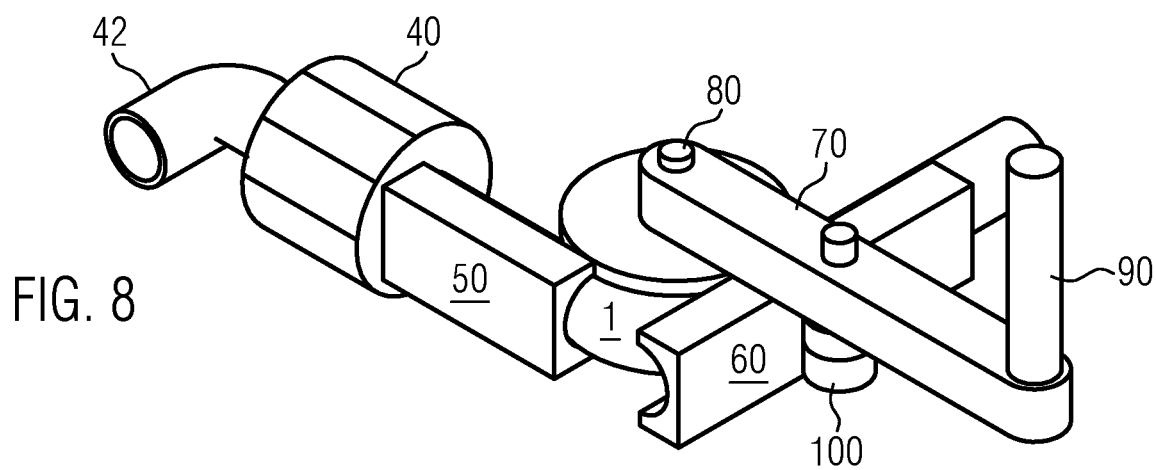

PREFORMED THERMOPLASTIC TUBE INCLUDING AT LEAST ONE BEND

CROSS-REFERENCE TO RELATED APPLICATIONS

This application claims priority to International Application No. PCT/EP2020/052685, filed Feb. 4, 2020, the contents of which are incorporated by reference herein in their entirety.

The present invention relates to a preformed thermoplastic tube having tube wall and including at least one bend formed by thermoforming.

Thermoplastic tubes are in most cases manufactured by extrusion, and are extruded as straight tubes. Thermoplastic tubes such as polyamide tubes are for example used in the automotive industry, namely in trucks and passenger cars as fuel lines, cooling-water pipes, vacuum lines, hydraulic pressure lines, coolant pipes or pneumatic lines. In modern vehicles the space available for routing tubes around motor and transmission components and other structures in the interior of the vehicle is very limited. Therefore, the tubes are preferably preformed in the shape of the desired tube routing. However, due to the limited space it would often be desired to preform the tube with sharp bends. Routing difficulties are encountered in particular for tubes having large outer diameters, for example in the range from 20 mm to 50 mm, and a typical wall thickness, for example in the range from 1.5 to 3 mm, because the smallest bend radii that can be achieved are still too large. With the currently used techniques for preforming tubes by thermoforming, which will be described in more detail below, the minimum bend-radius that can be achieved is about 2.5.OD (OD stands for the outer diameter of the tube). If one tries achieve even smaller bend-radii there is a high risk that the tube will be damaged by kinking.

The current thermoforming processes for preforming thermoplastic tubes to include one or more bends are carried out as described in the following. One example of such thermoforming process is described in U.S. Pat. No. 6,131,618 B1. A similar method for preforming a plastic tube by thermoforming is described in US 2016/0207247 A1. In such methods the originally straight thermoplastic tube is bent by forcing it into a channel of a template, which channel has the shape of the desired preform of the tube and which channel keeps the tube in the desired bent shape. Then heat is applied to the tube, for example by feeding a heating fluid such as hot air or a hot liquid to flow through the tube so that the tube reaches an elevated temperature which is lower by a certain safety margin than its melting temperature. This heat treatment serves to release the stresses in the bent plastic tube which were generated during bending so that the bent tube after the heat treatment step of thermoforming and cooling retains the preformed shape including the bend. In such preforming processes of thermoplastic tubes the actual thermoforming step is performed after the forming step inducing the bend. Such method may or may not include a certain pre-heating before the tube is subjected to bending. There, are many other ways to apply heat for thermoforming, e.g. by application of high-frequency electromagnetic fields, of infrared light, by immersing the bent tube in a hot bath or putting it in an oven, etc.

As already mentioned above, the bending radius that can be obtained for such preformed thermoplastic tubes is limited, and a bending radius of 2.5 times the outer diameter of the tube is normally the lower limit. In order to allow for sharper bends some attempts to develop alternative tube designs have been made which will be described in the following.

One approach was to provide the tube in the region where a sharp bend is needed with a corrugated tube section in which many corrugations follow each other in dense succession. The corrugated section is formed by subjecting an extruded tube section, immediately after extrusion so that the tube material is still soft, to a shaping procedure in which the tube wall is drawn onto a surrounding die structure (corrugators) by vacuum, wherein the surrounding die structure forms the tube wall into a series of subsequent corrugations. This gives the tube wall, in cross-section, an undulating waveform shape or sinusoidal shape. Such densely corrugated section of the tube has the advantage that it allows sharp bends with a bending radius as low as 1.5 times outer diameter of the tube, but also makes the tube very flexible so that the tube cannot retain a given shape in the corrugated section. However, there are several other significant drawbacks of such corrugated tubes.

First of all, corrugated tube sections create a significantly increased pressure drop along the corrugated section due to the disturbance of the flow path and the creation of turbulences in the flow. As a rule of thumb, a corrugated tube section gives about a three times higher pressure drop compared to a smooth tube section of the same length. Furthermore, the corrugation process slows down the extrusion speed because the corrugation process has to be performed directly after the extruder while the extruder has to run at a very low speed (limited to the speed of the corrugator tooling). Consequently, costs are increased because of a slowed down extrusion process including corrugation after the extrusion. In addition, the corrugated tooling (corrugator) is a very expensive piece of equipment which needs new investments for new tooling when different dimensions of the tube or of the corrugations to be formed in the tube wall are required. Another drawback is that the outer peaks of the corrugations project outwards compared to the outer surface of the adjacent smooth tube sections which requires more installation space in the corrugated tube section since a larger diameter than the outer diameter of the smooth tube sections is needed to accommodate the corrugated section. Furthermore, the corrugated tube section is straight but flexible so that the tube routing needs to be defined during installation by bending the corrugated tube section accordingly, but this routing has to be fixated by fixing the tube in the bent shape in place with clamps because the corrugated tube section is too flexible to retain its shape. This makes the installation and routing of the tube more complicated since sufficient fixation of the bent shape of the corrugated tube section is required to ensure that the corrugated tube section is retained in the bent shape also in the presence of engine vibrations and other vibrations due to travel motion. Finally, corrugated tube sections tend to move and elongate/shrink in case of internal tube pressure increase/decrease.

There is a variant of the corrugated tube design which can be described as a corrugated tube with flat side wall portions, as disclosed e.g. in U.S. Pat. No. 6,056,018 A and DE 10 2008 037 740 B4. Such tubes are in principle also corrugated tubes as described above, and are manufactured in the same manner, with the difference that not all corrugations are circumferentially extending completely around the tube. In case all corrugations are interrupted by one or more gaps around the circumference, these gaps may be aligned in longitudinal direction so that a stripe or band in the side wall of the tube is formed which is free of any corrugations.

Alternatively, the circumferential gaps of the corrugations may be offset with respect to each other circumferentially from corrugation to corrugation. In any case this design prevents or restricts longitudinal elongation or compression of the corrugated sections because the accordion- or concertina-like elongation/compression is prevented or restricted by side wall portions of the circumferential gaps of the corrugations. For this reason this type of corrugated tubes with flat side portions does not have the drawback of longitudinal expansion/compression in case of increase/decrease of internal pressure described above. Otherwise, this design suffers from all drawbacks described above for corrugated tubes.

Another variant of the corrugated tube design is referred to as an asymmetrical convolute tube and is disclosed in U.S. Pat. No. 6,123,113 A. As in corrugated tubes there are also corrugated tube sections connected by tube sections without corrugations. However, the corrugations in a corrugated tube section extend, in circumferential direction of the tube, only along a limited sector of the tube circumference, for example along one half of the circumference of the tube, whereas the opposite tube half has the smooth cylindrical wall of the original tube. This asymmetrical corrugated design has, due to the uncorrugated circumferential tube portions, a somewhat reduced pressure drop compared to fully corrugated tubes, but still has the drawback that the corrugated circumferential portions cause significant pressure drop. The problems associated with forming the corrugated sections, namely low process speed due to application of the corrugator directly after extrusion of a tube section and high costs in connection with manufacturing of the corrugator assembly, are the same as described above for the fully corrugated tubes. Also, problems associated with the fixation of the routing of such tubes are encountered: The tubes are stiffer than fully corrugated tubes, and therefore force is needed to bend the tube into the desired routing; to keep the bent tube in the desired shape clamps or fixation elements have to be applied in the bent areas to prevent that the tube elastically returns to its original straight shape. Furthermore, the high density of corrugations (large number of corrugations per length unit) and the large height (amplitude) of the corrugations in the corrugated portion of the circumference of the tube generate a high pressure drop.

It is an object of the present invention to provide a preformed thermoplastic tube which can be preformed with a bend having a tight bend radius but does not generate as much pressure drop than prior art designs as described above.

This object is achieved by the preformed thermoplastic tube comprising the features as defined in claim 1. Preferred embodiments of the invention are set out in the dependent claims.

According to the present invention a preformed thermoplastic tube having a tube wall and including at least one bend formed by thermoforming is provided, which preformed thermoplastic tube is characterized in that on the inner curve of the bend the tube wall is provided with a pattern of corrugations with minimal dimensions in terms of number of and heights of corrugations such that the wall length reduction resulting from the corrugations along the inner curve is kept at a minimal value necessary to absorb overlength on the inner curve resulting from forming the bend; on the outer curve of the bend the tube wall is smooth and free of corrugations.

The pattern of corrugations has minimal dimensions in the sense that the number of corrugations and their heights which determine a longitudinal length reduction of the tube wall, which equivalent length reduction is minimal and just sufficient to absorb the overlength on the inner curve of the tube wall resulting from forming the bend. In other words the dimensions of the pattern of corrugations are minimized in terms of number of and heights of corrugations to the minimum amount needed to compensate the reduced longitudinal tube wall length on the inner curve of the bend formed. This ensures that the pattern of corrugations causes the least possible disturbance or deviation from a smooth tube wall configuration, and therefore causes the least possible disturbance of the fluid flow through the tube, and thus the least possible pressure drop. On the other hand, the pattern of corrugations allows to form preformed thermoplastic tubes having sharp bending radii as low as 1.5.OD. Thus, the preformed thermoplastic tube according to the present invention allows to preform such thermoplastic tube with sharp bending radii as fully corrugated, conventional flexible tubes, but is, due to the minimal dimensions of the pattern of corrugations in terms of number of and heights of corrugations, not flexible, and thus does not need any fixation to keep its shape, and has a reduced flow resistance compared to fully corrugated tubes. A further reason for the significantly reduced flow resistance compared to fully corrugated tube sections is that the tube wall on the outer curve segment of the tube is smooth and free of any corrugations. This also significantly reduces the flow resistance compared to fully corrugated tubes, which is even more so because centrifugal forces acting on the fluid flowing through the bend tend to press the fluid flow towards the tube wall on the outer curve of the bend; for this reason the smooth tube wall on the outer curve of the bend results in a significant reduction of the pressure drop compared to fully corrugated tube sections.

A further advantage of this design with an outer curve section free of corrugations is the space saving aspect compared to fully corrugated tubes which consume more space by the outwardly projecting corrugations in the outer curve section. In addition, the initial straight tube can be made at a high extrusion speed, resulting in lower production costs. Furthermore, the delivery state of the thermoplastic with preformed bend(s) allows for an easier and quicker installation compared to fully corrugated tubes which need to be routed and fixed with clamping elements to maintain the routing. In addition, there is no length extension/reduction in response to internal pressure increase/decrease as in standard corrugated tubes. Finally, the thermoplastic tube of the present invention has more uniform, robust wall thickness; there is only a moderate thinning of the tube wall in the outer curve region which means much less thickness variation compared to standard corrugated tubing which has very much local thinning of the tube wall in corrugated shape up to approximately half of the original wall thickness.

In a preferred embodiment the pattern of corrugations consists of a series of folded up corrugations of the tube wall extending parallel to each other and circumferentially on an inner curve portion of the circumference of the bend of the tube.

In preferred embodiments the corrugations extend along 90° to 270° of the tube circumference; preferably the circumferential extension of the corrugations is in the range between 90° to 180°.

In the region of the bend the tube is considered to comprise opposite inner and outer curve portions. The inner curve and the outer curve tube wall portion may both extend circumferentially around 180°; however, in certain cases (if the corrugations have their maximal circumferential extension of 270°) the inner curve portion can be considered to extend circumferentially around up to 270°, wherein the remaining opposite 90° sector of the tube wall is then considered as outer curve portion.

In a preferred embodiment the pattern of corrugations consists of a series of 3 to 6 subsequent corrugations along the inner curve per 90° of bend-angle.

In a preferred embodiment the corrugations are formed such that the corrugations closer to the centre of the bend have a longer circumferential extension then corrugations further away from the centre, i.e. the circumferential extension of the corrugations gets smaller the closer the corrugations are to an adjoining straight part of the tube adjacent to the bend.

In a preferred embodiment the corrugations are formed to be equidistant along the inner curve of the bend with a corrugation pitch (peak to peak distance between neighbouring corrugations) in the range of 3 to 10 times the wall thickness of the tube, preferably in the range 4 to 7 times the wall thickness. The corrugation pitch is defined as the longitudinal distance between the peaks of adjacent corrugations. Higher values of corrugation pitch, for example corrugation pitch above 5, means that the distance between adjacent corrugations is relatively large which means that there can be small tube length sections with smooth inner tube wall on the inner curve between adjacent corrugations which contributes to a lower pressure drop.

In a preferred embodiment the corrugations are formed to the corrugation height in the range of 1.5 to 5 times the wall thickness of the tube, wherein the corrugation height is defined as the maximal radial distance between the level of the peak of a corrugation and the level of a valley between adjacent corrugations.

In a preferred embodiment the corrugations have a corrugation height in the range of 7.5-30% of the outer diameter of the tube, preferably of 15% of the outer diameter of the tube, wherein the corrugation height is defined as the maximal radial distance between the level of the peak of a corrugation and the level of a valley between adjacent corrugations.

In a preferred embodiment the thermoplastic tube has a tube wall of one or more layers is, wherein one layer or more layers consist of polyamide (PA), polyphthalamide (PPA), polyketone (PK), Polyphenylene sulphide (PPS), polyoxymethylene (POM), polyester, polyvinylidene fluoride (PVDF), polytetrafluoroethylene (PTFE), perfluoroalkoxy polymer (PFA), fluorinated ethylene propylene (FEP), polypropylene (PP) or thermoplastic vulcanizates or elastomers (TPV or TPE).

In a method for making a preformed thermoplastic tube according to the present invention, the tube is bent around and forced against a concavely curved surface of a forming tool, wherein during the bending a pattern of corrugations is formed on an inner curve of the tube while it is being bent, to absorb overlength resulting from length reduction of the inner curve tube wall due to the bending. The formation of this pattern of corrugations is induced by a corresponding pattern of depressions in the curved surface of the forming tool against which the tube is forced when the tube is being bent around the forming tool. In the course of this process the thermoplastic wall material on the inner curve being formed is compressed up to its buckling strength. By providing a pattern of depressions in the concavely curved surface of the forming tool the tube wall on the inner curved being formed tends to buckle in the region of a depression where space is available to receive an outwardly projecting, folded up corrugation, whereas the tube wall is supported by the concavely curved surface portions of the forming tool in regions between depressions so that buckling occurs in a controlled manner and into the depressions, thereby forming corrugations of outwardly buckled wall portions in a controlled manner. Since the series of corrugations are formed as a reaction of the tube wall length reduction on the inner curve when forming the bend it is ensured that dimensions of the corrugations are kept minimal at the least possible level; in other words the wall length reduction on the inner curve during bending of the tube is transformed into a pattern of corrugations, but no more or no higher corrugations then absolutely necessary are formed. Finally, the tube is heated to a forming temperature to perform thermoforming to fixate the bend and shape of the tube.

The pattern of depressions includes a series of depressions distributed along the concavely curved surface along the circumference of the forming tool. In particular the pattern of depressions may be a sequence of parallel grooves which sequence extends along the curved surface. However, in principle, each groove could also be replaced by a linear series of separate groove segments, which series extends transversely; alternatively the grooves could also be replaced by a distributed pattern of dimples to create a pattern of buckled elevations on the inner curve of the bend.

In a second step the thermoforming process is performed while the tube is still bent around the concavely curved surface of the forming tool, with the pattern of elevations on the inner curve surface on the tube received in the pattern of depressions of the forming tool. The thermoforming process releases stresses in the tube wall material that were created due to the bending, and thereby fixates the shape of the bend that has been formed before, and the shape of the elevations in the form of outwardly projecting convolutions, the generation of which was induced by the pattern of depressions.

It has been found that with this preforming method sharp bends can be preformed in thermoplastic tubes, with a bending radius as low as 1.5.OD. On the other hand the pressure drop that is created due to deviations from a smooth inner tube wall due to the corrugations is drastically reduced compared to the case of conventional, fully corrugated tubes. This is first due to the fact that the corrugations are formed on the inner curve of the bend only, whereas the inner tube wall in the area of the outer curve of the bend is smooth. In addition, due to the minimal dimensions of the corrugations in terms of their number and height, a pattern with a very low number of corrugations can be formed, in which case between corrugations on the inner curve of the bend there can be regions of smooth tube wall portions between adjacent corrugations so that much less turbulence is created on the inner curve compared to the fully undulating cross-sectional shape of a conventional corrugated tube. The pattern of depressions includes a series of depressions distributed along the concavely curved surface along the circumference of the forming tool. In particular the pattern of depressions may be a sequence of parallel grooves which sequence extends along the curved surface.

In another field of tube forming a tube bending method is known which has certain features in common with the method of the present invention. This prior art method is described to be applicable for bending steel tubes, for example to form an undulating steel tube for a heat exchanger from a straight tube as incoming member. Such method is for example described in U.S. Pat. No. 5,222,552 A. In this method a straight steel tube portion is bent around a bending tool having a concavely curved surface, wherein the bending tool may have the form of the bending wheel. The concavely curved surface of the bending tool is provided with a series of grooves, wherein the series of grooves serves to create a series of wrinkles on the inner curve surface of the bent steel tube in a controlled manner. Since steel is deformable by bending and is permanently deformable by bending it around a bending tool, and has a different elasticity and buckling behaviour of the wall during bending, it was surprisingly found that an analogous bending of a thermoplastic tube could indeed result in a controlled formation of convolutions of the thermoplastic wall material on the inner curve surface of the bending tube when the process is eventually combined with a thermoforming treatment while the tube is still bent around the forming tool with the pattern of elevations on the inner curve surface of the tube received in the pattern of depressions of the forming tool, to thereby fixate or retain the changed shape of the thermoplastic tube including the corrugations.

It has been found that the wall thickness in the area of the corrugations is essentially unchanged compared to the remaining tube.

In a preferred embodiment the thermoforming process includes first heating and thereafter cooling the tube, while the tube is still bent around the forming tool with the pattern of elevations on the inner curve surface of the tube received in the pattern of depressions of the forming tool. Heating of the tube may for example be carried out by feeding hot air to flow through the tube, and cooling may be performed by thereafter feeding cool air to flow through the tube.

In a preferred embodiment the cooling of the bent tube is performed to temperature below the glass transition temperature of the thermoplastic material of the tube.

In a preferred embodiment the thermoplastic tube is pre-heated before it is bent around and forced against the concavely curved surface of the forming tool. It has been found that by pre-heating the tube the generation of buckled convolutions of the bending tube wall is more consistent or reproducible, in particular for stiff thermoplastic materials, i.e. corrugations of very similar shape and size are formed. In such cases pre-heating of the tube to a temperature in the range of 50° to 80° is advantageous to induce generation of folded up convolutions of consistent size. Generally, the depressions in the forming tool are deeper (reach further below the surrounding surface portions of the concavely curved surface of the forming tool) than the convolutions or elevations intended to be formed on the inner curve surface of the bending tube.

In a preferred embodiment, the thermoplastic tube is heated to a forming temperature which is lower by a safety margin temperature difference $\Delta T$ than the melting temperature of the thermoplastic tube material, to ensure that no melting occurs before or during the thermoforming process. This safety margin temperature difference $\Delta T$ is larger than 10° C., preferably is in the range between 15° C. and 50° C.

In a preferred embodiment the pattern of depressions in the concavely curved surface of the forming tools is a series of elongated, parallel grooves, which extend transversely to and distributed along the longitudinal, concavely curved direction of extension of the concavely curved surface. For example, the concavely curved surface may be the bottom surface of a half-tube that is bent to extend around a circular circumference of the forming tool. The elongated grooves are then oriented transversely to the longitudinal direction of the tubular channel and are distributed along the longitudinal direction of the channel.

In a preferred embodiment the concavely curved surface of the forming tool is defined by an open channel in the form of a tube segment, for example of a half-tube, which is dimensioned to receive and support a portion of the tube to be preformed and which is, in its longitudinal, concavely curved direction, bent to follow at least a segment of a circle around a central axis, wherein the open top side of the channel is facing away from the channel axis. The open channel may also extend completely around the circular circumference of a forming tool which then has the form of a forming wheel.

In a preferred embodiment each of the grooves extends in the bottom of the channel transversely to the longitudinal direction of the channel at least a long part of the transverse width of the channel, i.e. when viewed from above the grooves extend on the channel bottom along the transverse width of the channel.

In a preferred embodiment a concavely curved forming surface is utilized which has a ratio of the width of each groove to the centre to centre distance of the adjacent grooves in the range between 0.6 and 0.9. For example 6 mm wide grooves may be used which have a centre to centre distance between adjacent grooves of 8 mm (which implies that there are 2 mm of concavely curved surface between adjacent grooves), which results in a ratio between groove width to a centre to centre distance of adjacent grooves of 0.75.

In a preferred embodiment the forming tool is pre-heated to a defined temperature before forming of the tube in order to enhance consistent formation of corrugations on the bending tube surface.

In a preferred embodiment the tube is held by a clamping block having a half-tubular channel for supporting the tube, wherein the clamping block extends to an end of the block which lies adjacent to the concavely curved surface of the forming tool and which extends parallel to a tangent on the concavely curved surface of the forming tool. In this manner the clamping block with a tube received therein can be moved against the forming tool to clamp the tube between the forming tool and the clamping block. In this position the tube projects from the clamping block and extends tangentially to the concavely curved surface of the forming tool. Furthermore, a pressing block having a half-tubular channel for supporting the tube is provided which is moved into contact with the projecting portion of the tube, wherein the bending block is rotated about the centre of curvature of the concavely curved surface of the bending tool to bend and press the projecting tube portion in a progressing manner against the concavely curved surface of the forming tool. The concavely curved surface of the forming tool may for example be circular so that the bending block is rotated about the central axis of the circular concave surface of the forming tool to bend the tube around it.

The invention will in the following be described with reference to examples in the drawings in which:

FIGS. 3 to 9 show schematic perspective views illustrating a method of making a thermoplastic tube according to the present invention.

Figure 2:
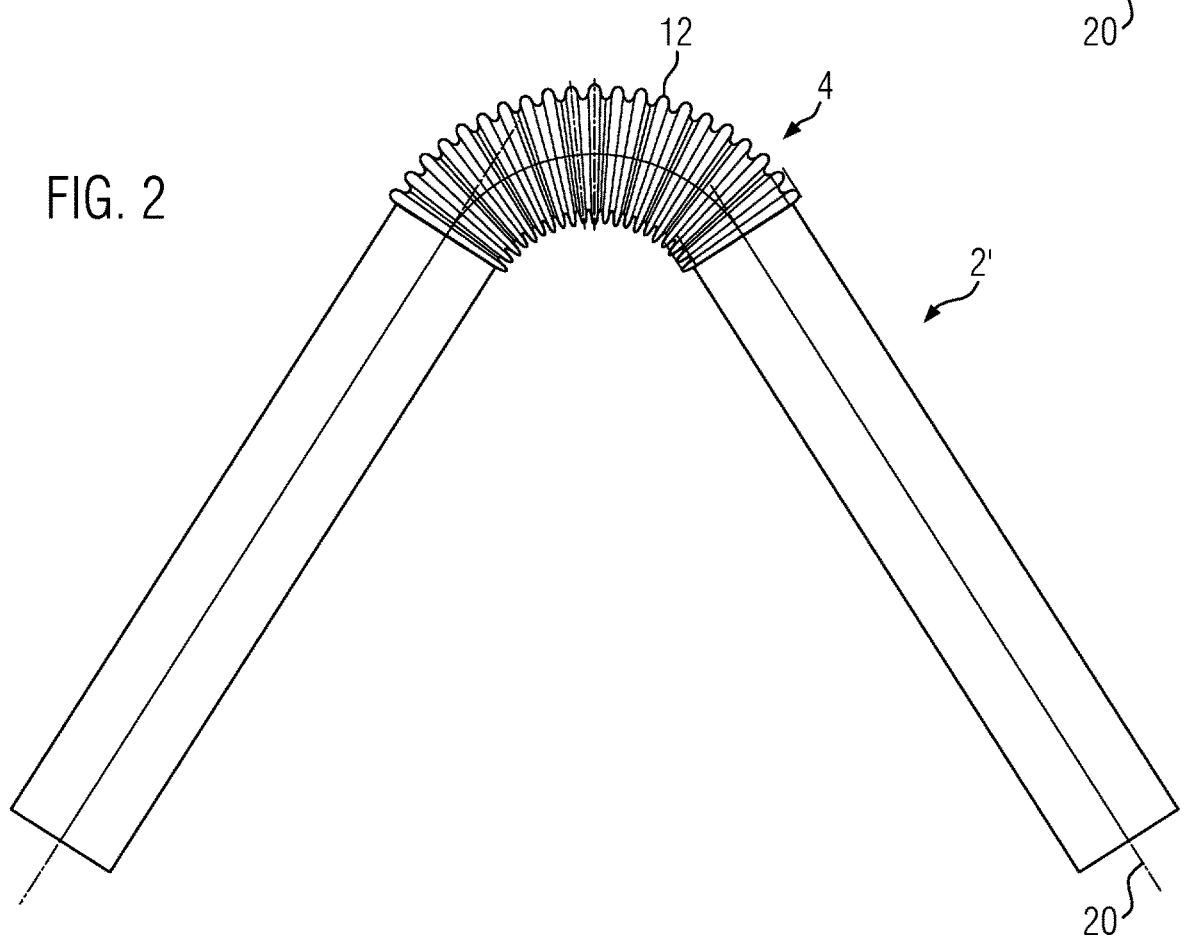
FIG. 2 shows a corresponding view of a conventional corrugated tube having a flexible bend.
Figure 3:
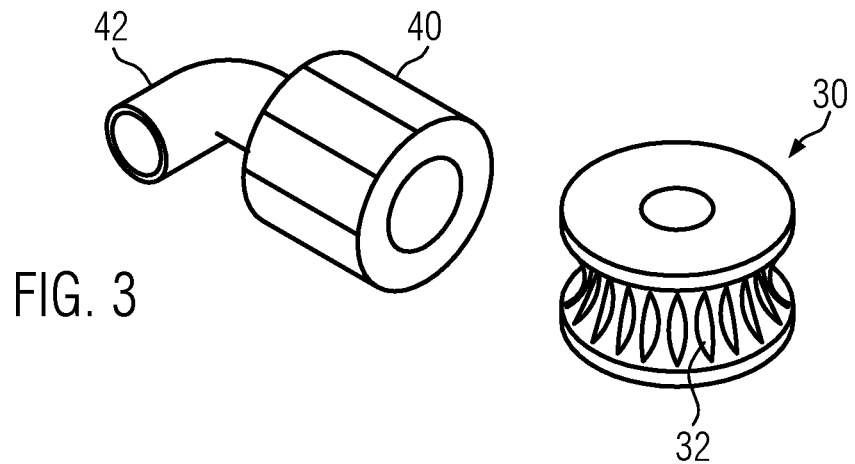

FIG. 2 shows a conventional thermoplastic tube having a conventional corrugated section 12 which is very flexible and allows to simply place the conventional tube 2' in the shape shown which includes a bend 4. However, it should be noted that the tube 2' is not stable in this state due to the flexibility of the conventional corrugated section 12 but has to be fixated by fixation or clamping elements if the bent state as shown in FIG. 2 should be maintained. As described in the introduction such conventional tubes including conventional corrugated sections have a lot of drawbacks in practice.

Figure 1:
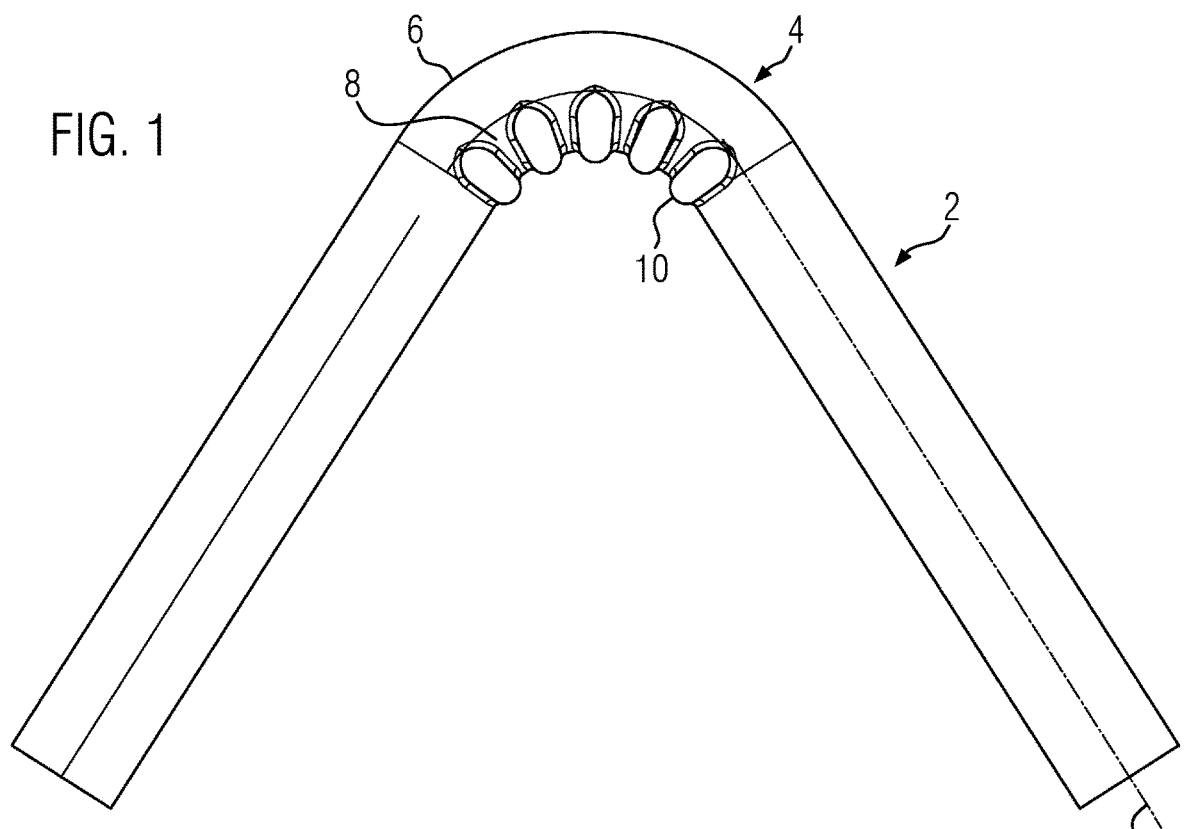
FIG. 1 shows a plan view of a preformed thermoplastic tube according to the present invention.

FIG. 1 shows a thermoplastic tube 2 according to the present invention which has been preformed to include a permanent bend 4. In particular, this bend has been fixated by thermoforming and includes an outer curve 6 having a smooth, curved tube wall, and an inner curve 8 being provided with a number of outwardly folded up corrugations 10, in this case five subsequent corrugations. This pattern of corrugations 10 on the inner curve 8 has minimal dimensions in terms of number of corrugations and their height such that the length taken up by the corrugations is just the length reduction resulting from the reduced length of the tube wall along the inner curve due to forming the bend 4 (minimal dimensions in terms of number of corrugations and their height then means if the pattern would only have four corrugation instead of five as shown in FIG. 1, the height of each of the four corrugations would have to be about 25% higher so that the length reduction equivalent would be same as for five corrugations as shown in FIG. 1). In other words corrugations 10 are formed on the inner curve of the tube according to the invention to the minimal extent possible which corresponds to a pattern of corrugations that is just sufficient to absorb the overlength created on the inner curve as a result of forming the bend 4. Such minimal pattern of corrugations on the inner curve, while the tube wall is kept smooth on the outer curve 6, has a number of advantages. The minimized dimensions of the corrugations 10 on the inner curve 8 create much less flow resistance compared to a conventionally corrugated section 12 because on the one hand the number of corrugations on the inner curve is greatly reduced, without increasing the height of the corrugations, and on the other hand the outer curve of the bend 4 has a smooth tube wall free of any corrugations. Therefore, the outer curve circumferential portion 6 of the bend 4, which is of even higher importance with respect to flow resistance because centrifugal forces on the fluid flowing through the bend urge fluid towards the inner tube wall in the outer curve portion 6, is completely smooth and therefore causes much less flow resistance compared to the outer circumferential section of a conventionally corrugated bend 4 of a conventional corrugated tube 2' as in FIG. 2.

A comparative test was carried out to compare the flow resistance of the preformed thermoplastic tube 4 according to the present invention such as shown in FIG. 1 with a conventional, flexible corrugated tube 2' such as shown in FIG. 2 was performed using the thermoplastic tubes and measuring a condition as described in the following.

As described before, FIG. 2 shows a conventional corrugated tube from serial production for coolant water application. This tube has the following parameters:
Internal diameter: 16 mm,
Outside diameter: 18 mm,
Bend-angle: 115°
Bend-radius: R 27 mm which equals 1.5.OD,
21 corrugations,
Both straight legs are 110 mm.

The product is flexible, and was fixed with tape in the correct position during test in order to be kept at 115° bend angle.

FIG. 1 shows a thermoplastic tube according to the present invention having the following parameters:
Internal diameter: 16 mm,
Outside diameter: 18 mm,
Bend-angle: 115°,
Bend-radius: R 27 mm which equals 1.5.OD,
5 corrugations which are on inner curve only: 180° of circumference,
and smooth outer curve,
Both straight legs are 110 mm,
The product is preformed (stiff, and keeps its shape).
These tubes of FIGS. 1 and 2 are comparable products.
The pressure-drop for coolant-water-flow at a flow rate of 1.8 m³/hr (which is a typical flow rate for this size of tube) was measured.
The pressure-drops measured were:
For the conventional tube (FIG. 2): 55 mbar.
For the tube according to the invention (FIG. 1): 36 mbar.

The improvement in pressure-drop is therefore approximately 35%. It should be noted that in fact the improvement of the bend itself in % is even higher, because in this test the total pressure-drop also includes pressure-drop contributions of the two straight sections (110 mm) of the tube (the straight sections are the same in the conventional tube and the tube according to the invention as specified above, so no improvement is contributed by those straight sections). Therefore the improvement of the bended section itself is in fact more than this 35%. Therefore an additional calculation/correction was done, and the improvement for the bend only (after subtraction of the straight lengths) was estimated to be 41%.

A method of making a preformed thermoplastic tube including at least one bend according to the present invention will now be described with reference to FIGS. 3 to 8 which show schematic perspective views when carrying out the method.

The apparatus for carrying out the method comprises a forming tool 30 in the form of a forming wheel having a concavely curved forming surface, in this case a circular forming surface which has the shape of an open, half-tubular channel extending 360° around the circumference of the forming wheel. The bottom of the channel presenting the concavely curved forming surface is provided with a series of depressions or grooves 32. The grooves extend over almost the entire width of the half-tubular channel on the forming wheel.

Figure 4:
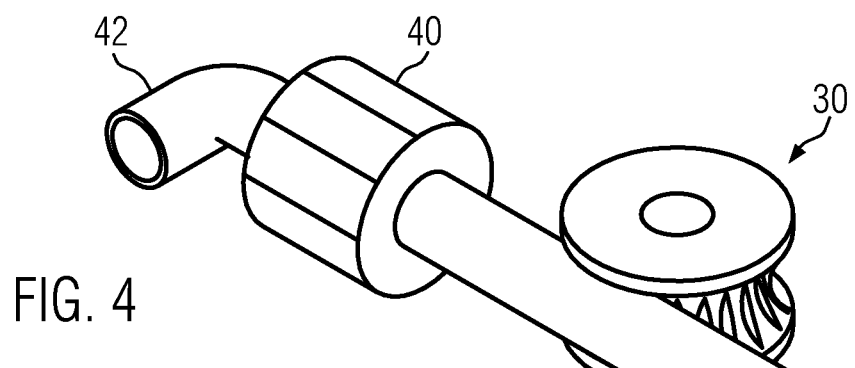

The apparatus further comprises a supply pipe 42 to a hot air supplying machine (not shown). The supply pipe 42 is connected to a support sleeve 40 which has an opening for receiving an end portion of an originally straight thermoplastic tube 1, as shown in FIG. 4 in the inserted state.

Figure 5:
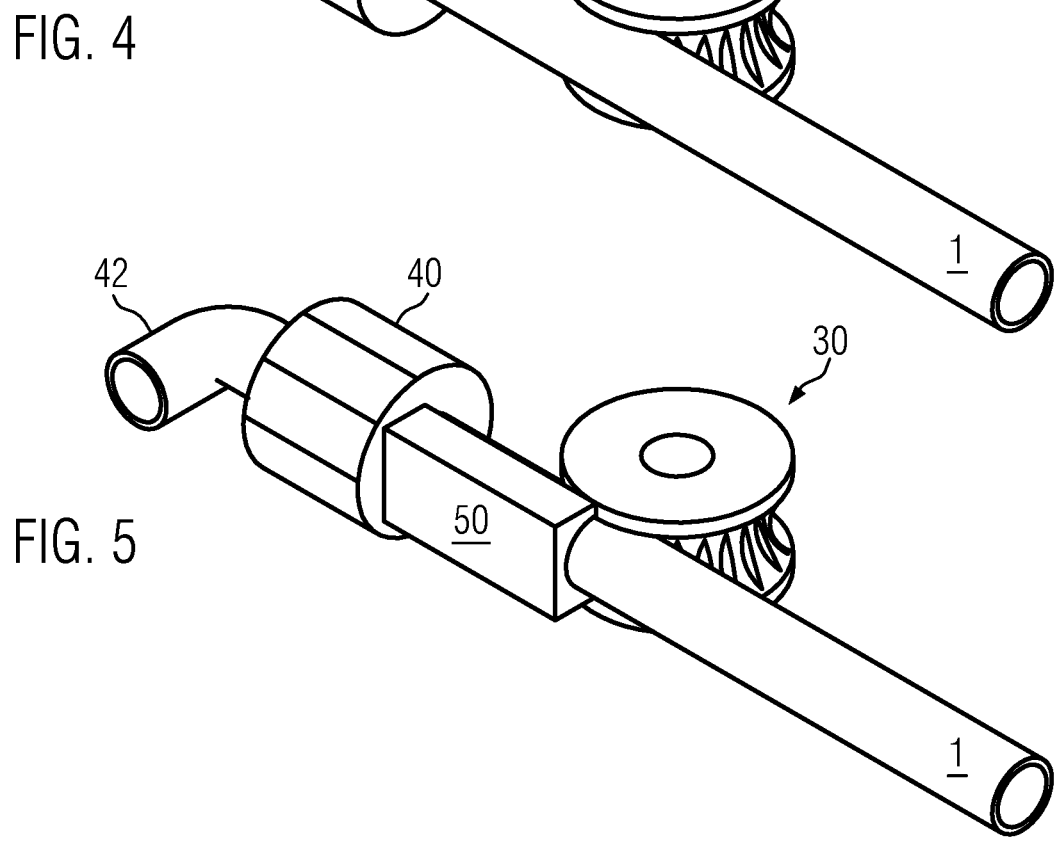

A clamping block 50 is provided, as shown in FIG. 5, which has an open, half-tubular channel for supporting one side of the original straight tube 1. In this manner clamping block 50 supports tube 1 and presses it into the half-tubular channel of the concavely curved forming surface of the forming tool 30, so that the tube 1 is held in place by the cooperating clamping block 50 and forming tool 30, as shown in FIG. 5.

Furthermore, the apparatus for making the thermoplastic tube comprises a movably mounted pressing block 60 which also has an open, half-tubular channel for supporting the tube 1.

In addition, the apparatus comprises a lever arm 70 which is pivotally mounted on a pivot pin 80 mounted on the central axis of the forming wheel 30. Opposite to the pivot pin 80 a handle 90 is connected to the lever arm 70 to allow to manually pivot the lever arm 70 around the central axis of the forming wheel 30. The lever arm 70 is further provided with a roller 100 that is rotatable mounted to the lever arm 70 and which comes into contact with an outer surface of the pressing block 60 (as shown in FIG. 8).

For carrying out the method of making a thermoplastic tube according to the present invention first an originally straight thermoplastic tube 1 is inserted in the support 40. In this state the thermoplastic tube 1 may be pre-heated by supplying hot air through the supply pipe 42 to flow through the thermoplastic tube 1. Pre-heating is preferred, in particular for relatively stiff thermoplastics, to ensure that corrugations fold up upon bending with consistent shapes and sizes.

When the thermoplastic tube has been sufficiently preheated and the support block 50 and the pressing block 60 have been brought into position, and the lever arm 70 has been provided as shown in FIG. 7, the lever arm 70 is pivoted by turning the handle 90 to rotate the lever arm 70 about the central axis of the forming wheel 30. In the course of this pivotal movement of the lever arm 70 the roller 100 carried by the lever arm 70 is rolling along the outer surface of pressing block 60, and is thereby urging the pressing block 60 to pivot about the central axis of the forming wheel 30. Due to this movement of the pressing block 60 the tube 1 supported by the pressing block 60 is bent around the concavely curved surface of the forming wheel 30, as illustrated in FIG. 8. During this bending process the pressing block 60 also presses the tube 1 to the circumferential channel of the forming wheel 30, wherein this half-tubular channel is provided with a series of parallel depressions or grooves 32 (see FIG. 3) as described above. During this bending process the thermoplastic wall material on the inner curve being formed is compressed to allow for a shorter tube wall length on the inner curve of the bend compared to the outer curve. During this compression the tube wall is compressed up to its buckling strength. By pressing it against a pattern of depressions 32 (see FIG. 3) in the concavely curved surface of the forming tool 30 the tube wall on the inner curve being formed tends to buckle in the regions of the depressions 30 where space is available to receive a folding up corrugation of an inner curved tube wall portion, whereas the tube wall on the inner curve is, in regions between depressions 32, supported by the concavely curved surface portions of the forming wheel 30. In this manner buckling occurs in a controlled manner and into the depressions 32, thereby forming folded up corrugation in a controlled manner in a desired pattern.

In this manner a pattern of corrugations is formed on the inner curve of a preformed thermoplastic tube including at least one bend, wherein the pattern of corrugations may be formed with minimal dimension in terms of the number of corrugations and their height because the corrugations are formed by the process of absorbing overlength generated on the inner curve of the bend being formed during bending so that the corrugations formed in a controlled manner in a desired pattern just take up the overlength created but does not include any further corrugations on the inner curve so that the extent of corrugations (the combined effect of the number of corrugations and their height as expressed by the length absorbed by the folded up corrugations) is kept at a minimum.

Eventually the lever arm 70 is turned around from the position shown in FIG. 8 to make a 180° turn to bend the tube 1 to a bent state including a 180° turn or any other required angle. When the desired angle has been reached the lever is locked to keep it in position during the thermoforming process.

Once forming of the bend is completed the bend pipe is heated up by supplying hot air to the supply pipe 42 to heat up the tube to a forming temperature to carry out thermoforming. In this step the thermoplastic material of the bent tube is brought to a temperature which is slightly below the melting temperature, whereby stresses in the plastic material which were generated in the bending process are released so that the thermoplastic material permanently keeps the shape formed in the bending step.

Figure 9:
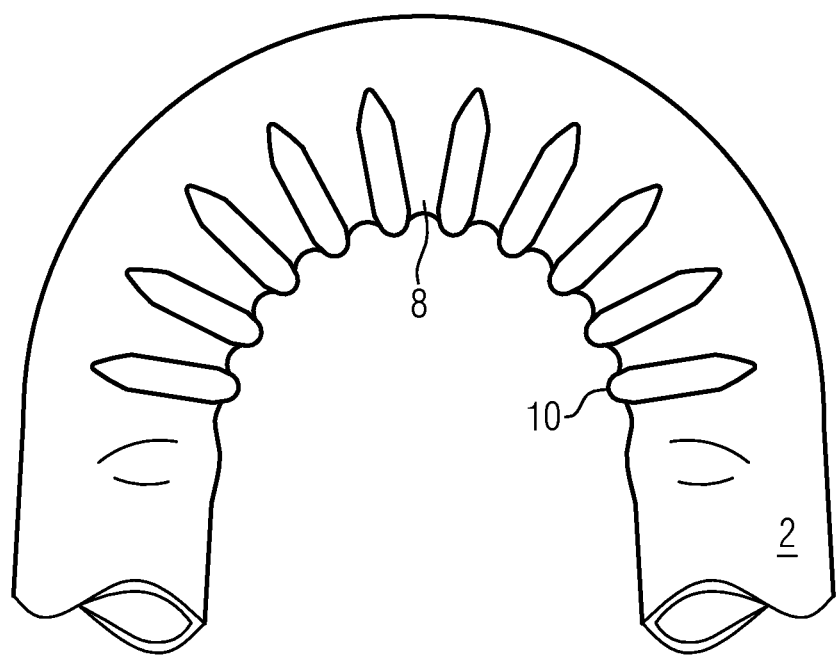

In FIG. 9 a schematic view of the resulting preformed thermoplastic tube 2 is shown which has been made by turning the lever arm 70 to a 180° turn about the pivot pin 80 on the central axis of the forming wheel 30. This thermoplastic preformed tube has been made to include a 180° bend with a pattern of corrugations which has been formed by the bending process and the pattern of the depressions in the concavely curved forming surface of the forming wheel 30. In this case the pattern of corrugations included ten equidistant corrugations 10 along the inner curve of a 180° bend.

In the example of FIG. 9 the pattern of corrugations is a series of equidistant corrugations transversely extending to the longitudinal axis of the tube along part of its circumference, in this case slightly beyond 180°. In such case, when the circumferential extension of the corrugations is more than 180°, the grooves (depressions) have to extend further than the grooves 32 shown in FIG. 3 (which have a circumferential extension of slightly less than 180°) and have to extend even beyond the transverse width at the open top side of the half-tubular channel. This means that the half-tubular channel of the forming wheel has cutouts in its opposite side walls where the grooves extend up to and through the side walls of the forming wheel 30. In case corrugations are to be formed which extend beyond 180° of the circumference of the bent tube, there must be corresponding grooves in the half-tubular channel of the pressing block 60 which grooves form extensions of the grooves 32 in the half-tubular channel of the forming wheel so that the aligned grooves of the forming wheel and the pressing block extend beyond 180°.

The invention claimed is:

1. A method for making a preformed thermoplastic tube having a tube wall having a wall thickness and including at least one bend formed by thermoforming, wherein on the inner curve of the at least one bend the tube wall is provided with a pattern of corrugations with selected dimensions in terms of number of and heights of corrugations such that a wall length reduction resulting from the corrugations along the inner curve is kept at a minimal value necessary to absorb overlength on the inner curve resulting from forming the bend, and in that on the outer curve of the at least one bend the tube wall is smooth and free of corrugations, in which method a straight thermoplastic tube is provided,
characterized in that said method comprises:
holding the thermoplastic tube at a temperature that is below a thermoforming temperature;
bending and forcing the thermoplastic tube, at the temperature below the thermoforming temperature, against a concavely curved surface of a forming tool to shape the thermoplastic tube to obtain the at least one bend, wherein during the bending a pattern of corrugations is formed on an inner curve surface of the at least one bend to absorb an overlength resulting from a length reduction of the inner curve surface due to the bending, wherein the pattern of corrugations is formed by a corresponding pattern of depressions in the concavely curved surface of the forming tool against which the thermoplastic tube is forced when the thermoplastic tube is being bent around the forming tool;
after bending and forcing the thermoplastic tube against the concavely curved surface, heating the thermoplastic tube to the thermoforming temperature while the thermoplastic tube is still bent around the forming tool; and forming the pattern of corrugations on the inner curve of the thermoplastic tube received in the pattern of depressions of the forming tool.

2. The method according to claim 1, characterized in that the thermoforming process includes heating and thereafter cooling the tube while the tube is still bent around the forming tool with the pattern of corrugations on the inner curve surface of the tube received in the pattern of depressions of the forming tool.

3. The method according to claim 1, characterized in that the thermoplastic tube is pre-heated before it is bent around and forced against the concavely curved surface of the forming tool.

4. The method according to claim 1, characterized in that the pattern of depressions in the concavely curved surface of the forming tool is a series of elongated, parallel grooves, which extend transversely to and distributed along the longitudinal, concavely curved direction of extension of the concavely curved surface.

5. The method according to claim 1, characterized in that the concavely curved surface of the forming tool is defined by an open channel of a tube segment which is dimensioned to receive and support a portion of the tube and which is, in its longitudinal, concavely curved direction, bent to follow a segment of a circle around a central axis, wherein an open top side of the channel is facing away from the central axis.

6. The method according to claim 5, characterized in that the pattern of depressions on the concavely curved surface of the forming tool includes a plurality of grooves, the plurality of grooves having a ratio of a width of each of the plurality of grooves to a centre-to-centre distance of adjacent ones of the plurality of grooves in the range between 0.6 and 0.9.

7. The method according to claim 1, characterized in that a tube is held by a clamping block having a half-tubular channel for supporting the tube against the concavely curved surface of the forming tool, and projects from the clamping block at the end of the clamping block tangentially to the oppositely disposed concavely curved surface, and a pressing block having half-tubular channel for supporting the tube is in contact with a projecting portion of the tube, wherein the pressing block is rotated about a centre of curvature of the concavely curved surface of the forming tool to bend and press the projecting tube portion in a progressing manner against the concavely curved surface of the forming tool.

8. The method according to claim 1, wherein each of the corrugations includes a height that is between about 1.5 and about 5 times the wall thickness.

9. The method according to claim 1, wherein a ratio of the width of each depression of the pattern of depressions in the concavely curved surface of the forming tool to the centre-to-centre distance of the adjacent depression of the pattern of depressions is between 0.6 and 0.9.

10. The method of claim 1, wherein each corrugation of the plurality of corrugations includes a peak-to-peak distance between neighbouring corrugations of between 3 and 10 times the wall thickness.

\* \* \* \* \*